(12) United States Patent
Hayashi

(10) Patent No.: US 12,523,334 B2
(45) Date of Patent: Jan. 13, 2026

(54) HEAT INSULATION PIPE

(71) Applicant: HONDA MOTOR CO., LTD., Tokyo (JP)

(72) Inventor: Ryosuke Hayashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 11 days.

(21) Appl. No.: 18/618,001

(22) Filed: Mar. 27, 2024

(65) Prior Publication Data

US 2024/0328567 A1  Oct. 3, 2024

(30) Foreign Application Priority Data

Mar. 30, 2023 (JP) ................. 2023-055352
Mar. 30, 2023 (JP) ................. 2023-055379

(51) Int. Cl.
  *F16L 59/21*  (2006.01)
  *F16L 51/03*  (2006.01)
  *F16L 59/065* (2006.01)

(52) U.S. Cl.
  CPC ............ *F16L 59/21* (2013.01); *F16L 51/03* (2013.01); *F16L 59/065* (2013.01)

(58) Field of Classification Search
  CPC ........ F16L 59/21; F16L 51/03; F16L 59/065; F16L 59/143; F16L 51/025
  USPC ..................................................... 285/227
  See application file for complete search history.

(56) References Cited

U.S. PATENT DOCUMENTS

| | | | | |
|---|---|---|---|---|
| 2,014,355 | A | * | 9/1935 | Hussman ........... F16L 27/111 29/454 |
| 4,215,882 | A | * | 8/1980 | Bosch ............... F16L 27/111 285/227 |
| 5,299,840 | A | * | 4/1994 | Heye ................. F16L 51/035 285/227 |
| 2006/0081302 | A1 | * | 4/2006 | Taira ................. F01N 13/009 138/132 |
| 2010/0178099 | A1 | * | 7/2010 | Chahine ............ F16L 51/028 403/51 |
| 2014/0008909 | A1 | * | 1/2014 | D'Orazio ........... F24S 80/30 285/91 |

FOREIGN PATENT DOCUMENTS

| | | |
|---|---|---|
| JP | 58-9164 Y2 | 2/1983 |
| JP | 61-46172 Y2 | 12/1986 |
| JP | H2-69197 U | 5/1990 |

* cited by examiner

*Primary Examiner* — James M Hewitt, II
(74) *Attorney, Agent, or Firm* — Rankin, Hill & Clark LLP

(57) ABSTRACT

A heat insulation pipe includes an inner pipe and an outer pipe. The inner pipe includes a pair of inner pipe members spaced apart from each other in an axial direction of the inner pipe, a first bellows disposed between the pair of inner pipe members, and a restriction mechanism for restricting expansion and contraction of the inner pipe in the axial direction to a predetermined range. The restriction mechanism is slidable with respect to at least one of a pair of bulging portions. The outer pipe includes a pair of outer pipe members each including a second bellows, and a second cylindrical portion housing the first bellows and the restriction mechanism.

13 Claims, 3 Drawing Sheets

HEAT INSULATION PIPE

CROSS-REFERENCE TO RELATED APPLICATIONS

This application is based upon and claims the benefit of priority from Japanese Patent Application No. 2023-055352 filed on Mar. 30, 2023 and No. 2023-055379 filed on Mar. 30, 2023, the contents all of which are incorporated herein by reference.

BACKGROUND OF THE INVENTION

Field of the Invention

The present invention relates to a heat insulation pipe.

Description of the Related Art

Conventionally, in a heat insulation pipe having a double pipe structure including an inner pipe and an outer pipe, a configuration including a bellows for absorbing deformation (thermal expansion or thermal contraction) in its axial direction due to a temperature change is known. When laying pipes in a long range, a plurality of heat insulation pipes as unit pipes are sequentially connected. In order to prevent the plurality of bellows from expanding/contracting unevenly, for example, JP S58-009164 Y2 proposes a structure in which a pipe is provided with a projection and stopper members. In JP H02-069197 U, a formed bellows is used for each of the inner pipe and the outer pipe. The formed bellows is a bellows having a corrugated cross-sectional shape which meanders so as to have crest portions and root portions which are curved in a C-shape or a U-shape.

SUMMARY OF THE INVENTION

In the structure shown in FIG. 1 of JP S58-009164 Y2, a tubular member ("outer pipe 12" in JP S58-009164 Y2) to which stopper members are attached is required separately from the outer pipe ("protective outer pipe 3" in JP S58-009164 Y2) constituting the outer part of the double pipe structure. Therefore, the outer diameter of the entire pipe increases, and the number of parts of the pipe increases. In addition, the structure shown in FIG. 4 of JP S58-009164 Y2 can cope with only deformation in one direction (the direction in which the bellows disposed at the center of the inner pipe in the axial direction extends).

In the joint structure of a double pipe shown in JP H02-069197 U, formed bellows are used for both of the inner pipe and the outer pipe. Therefore, when the joint structure is deformed to be bent by an external force input to the pipe or an axial stress generated by deformation due to a fluid flowing inside the pipe, the pipe cannot remain straight. When there is a space around the pipe or when the pipe is disposed inside a moving object, even if the pipe cannot remain straight, a harmful effect is unlikely to occur. However, when there is no space around the pipe or when the pipe is disposed outside a moving object, the outer pipe of the pipe may be damaged by coming into contact with a surrounding wall. In this case, the heat insulation function of the pipe may be impaired, or air resistance may increase due to distortion of the entire pipe.

An object of the present invention is to solve at least one of the above-mentioned problems.

A first aspect of the present invention is characterized by a heat insulation pipe including an inner pipe and an outer pipe containing thereinside the inner pipe, wherein both ends of the outer pipe are joined to the inner pipe to thereby seal an inside of the outer pipe, wherein the inner pipe includes: a pair of inner pipe members each including a first cylindrical portion and a bulging portion that protrudes radially outward from an outer circumferential surface of the first cylindrical portion, the pair of inner pipe members being spaced apart from each other in an axial direction of the inner pipe; a first bellows disposed between the pair of inner pipe members and configured to absorb thermal expansion or thermal contraction of a pipe caused by a temperature of a fluid flowing through an inside of the pipe; and a restriction mechanism that is coupled to the bulging portion of one of the pair of inner pipe members and to the bulging portion of another of the pair of inner pipe members, and configured to restrict expansion and contraction of the inner pipe in the axial direction to a predetermined range, the restriction mechanism is slidable with respect to at least one of a pair of the bulging portions, and the outer pipe includes: a pair of outer pipe members each including a second bellows expandable and contractible along the axial direction of the inner pipe, the pair of outer pipe members being joined respectively to the pair of inner pipe members; and a second cylindrical portion disposed between the pair of outer pipe members and configured to accommodate the first bellows and the restriction mechanism.

According to the first aspect, the restriction mechanism for restricting, to a predetermined range, the amount of deformation of the first bellows caused by thermal expansion or thermal contraction of the pipe to which the heat insulation pipe is applied is disposed in the inside of the outer pipe (i.e., a space formed between the outer pipe and the inner pipe). Thus, it is possible to prevent the increase in the outer diameter of the heat insulation pipe due to the installation of the restriction mechanism. Since the restriction mechanism restricts the deformation amount (expansion/contraction amount) of the first bellows to a predetermined range, the restriction mechanism can exhibit a deformation amount restriction function for both thermal expansion and thermal contraction. The inner pipe and the restriction mechanism are integrated together. Thus, when the heat insulation pipe is assembled, the inner pipe integrated with the restriction mechanism can be disposed in the outer pipe, and the inner pipe members of the inner pipe can be positioned at the openings of the outer pipe members of the outer pipe. Therefore, the heat insulation pipe can be easily assembled.

A second aspect of the present invention is characterized by a heat insulation pipe including an inner pipe and an outer pipe containing thereinside the inner pipe, wherein both ends of the outer pipe are joined to the inner pipe to thereby seal an inside of the outer pipe, and a space between the inner pipe and the outer pipe is depressurized to a predetermined pressure, wherein the inner pipe includes: a pair of inner pipe members spaced apart from each other in an axial direction of the inner pipe; a first bellows disposed between the pair of inner pipe members and configured to absorb thermal expansion or thermal contraction of a pipe caused by a temperature of a fluid flowing through an inside of the pipe; and a restriction mechanism configured to restrict, to a predetermined range, an amount of deformation of the inner pipe in the axial direction caused by the temperature of the fluid when the fluid flows through the inner pipe, the outer pipe includes: a pair of outer pipe members each including a second bellows expandable and contractible along the axial direction of the inner pipe, the pair of outer pipe members being joined respectively to the pair of inner pipe members; and a second cylindrical portion disposed between the pair of outer pipe members and configured to accommodate the first bellows and the restriction mechanism, a cross section of the first bellows along an axial direction of the first bellows is a first corrugated cross section having crest portions each curved in a C-shape or a U-shape and root portions each curved in a C-shape or a U-shape, and a cross section of the second bellows along an axial direction of the second bellows is a second corrugated cross section having crest portions each bent in a V-shape and root portions each bent in a V-shape.

According to the second aspect, the cross section of the first bellows of the inner pipe is the first corrugated cross section having the crest portions and the root portions each curved in a C-shape or a U-shape. Thus, the first bellows can effectively absorb the input of the external force by not only expanding/contracting in the axial direction but also deforming so as to bend. On the other hand, the second bellows of the outer pipe has the second corrugated cross section having the crest portions and the root portions each bent in a V-shape. Thus, the second bellows is easily deformed in the axial direction but is hardly deformed in the bending direction, when being subjected to thermal expansion or thermal contraction in the axial direction and input of external force. Therefore, even when the first bellows of the inner pipe is deformed to bend, the second bellows expands or contracts in the axial direction without bending, and thus its straight piping layout can be maintained.

The above and other objects features and advantages of the present invention will become more apparent from the following description when taken in conjunction with the accompanying drawings in which a preferred embodiment of the present invention is shown by way of illustrative example.

DETAILED DESCRIPTION OF THE INVENTION

Figure 1:
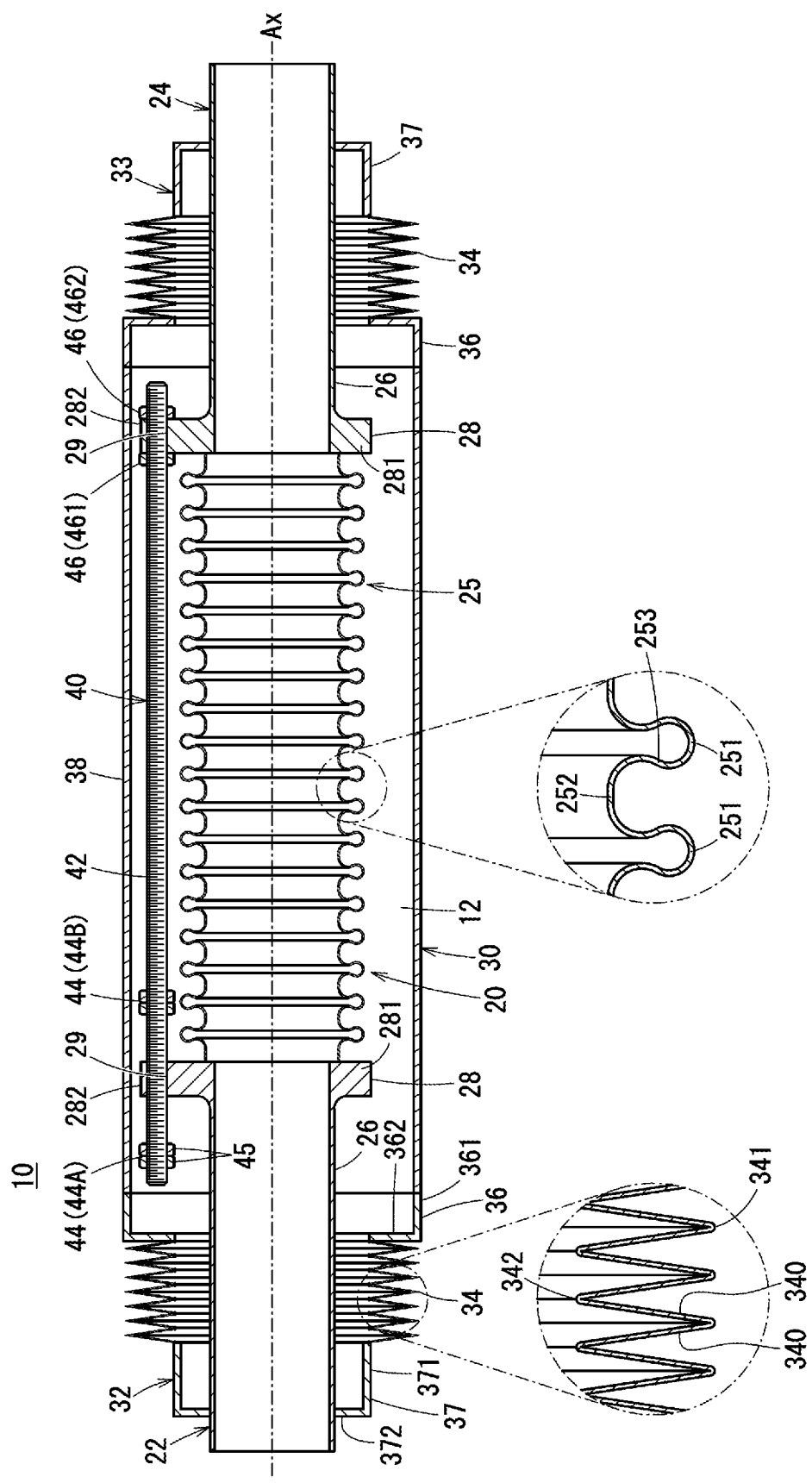
FIG. 1 is a cross-sectional view of a heat insulation pipe according to an embodiment of the present invention.

A heat insulation pipe 10 according to the present embodiment shown in FIG. 1 is used in a transfer line for transferring a low-temperature or high-temperature fluid. The fluid to be transferred is a liquid or a gas. In this case, the liquid may be, for example, a liquid fuel (such as liquid nitrogen at cryogenic temperature). The gas may be, for example, exhaust gas or a gaseous refrigerant.

The heat insulation pipe 10 includes an inner pipe 20 and an outer pipe 30 containing the inner pipe 20 inside the outer pipe. Both ends of the outer pipe 30 are joined to the inner pipe 20, to thereby seal the inside of the outer pipe 30. A space between the inner pipe 20 and the outer pipe 30 serves as a heat insulation chamber 12. The heat insulation chamber 12 is decompressed to a predetermined pressure and is placed in a vacuum state. Instead of placing the heat insulation chamber 12 in such a vacuum state, the heat insulation chamber 12 may be filled with an inert gas. Examples of the inert gas include nitrogen gas and argon gas. Since the heat insulation effect can be achieved even when the heat insulation chamber 12 is not decompressed, the heat insulation chamber 12 may be filled with air at atmospheric pressure.

The hollow portion of the inner pipe 20 serves as a passage for a fluid. The inner pipe 20 includes a pair of inner pipe members 22, 24 and a first bellows 25 disposed between the pair of inner pipe members 22, 24. The pair of inner pipe members 22 and 24 are spaced apart from each other in the axial direction of the inner pipe 20. Each of the pair of inner pipe members 22, 24 includes a cylindrical portion 26 (hereinafter, referred to as a first cylindrical portion 26) and a bulging portion 28 that protrudes radially outward from an outer circumferential surface of the first cylindrical portion 26.

The first cylindrical portion 26 is a straight pipe having an inner diameter and an outer diameter that are substantially constant in the axial direction. The bulging portion 28 protrudes radially outward from one end portion of the first cylindrical portion 26 in the axial direction. The bulging portion 28 has a through hole 29 that penetrates in the axial direction.

Figure 2:
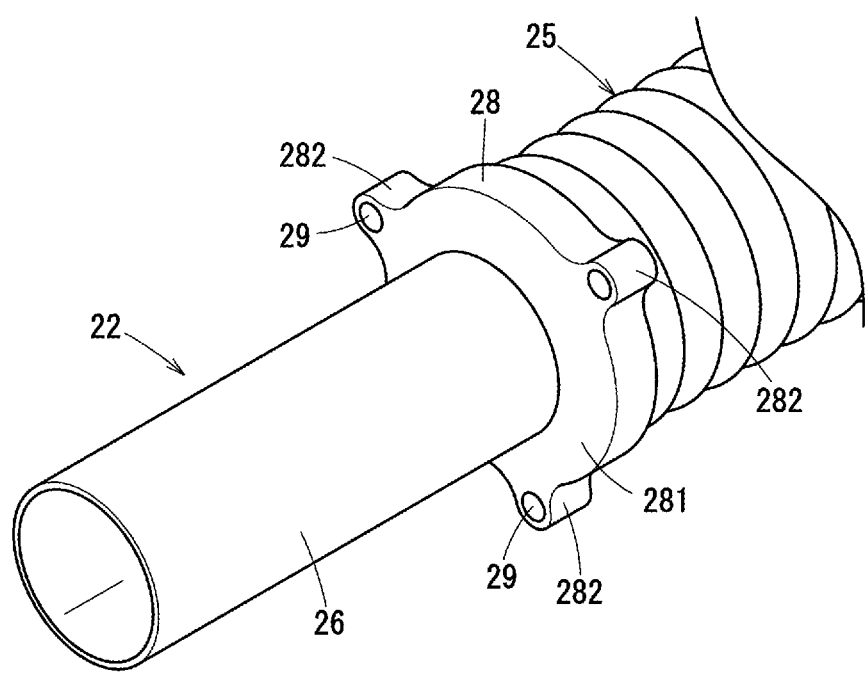
FIG. 2 is a perspective view of an inner pipe member.

As shown in FIG. 2, the bulging portion 28 includes a circular ring-shaped flange portion 281 that protrudes radially outward from the outer circumferential surface of the one end portion of the first cylindrical portion 26 in the axial direction and that extends in the circumferential direction, and a protrusion 282 that protrudes radially outward from the outer circumferential surface of the flange portion 281. In the present embodiment, the plurality of protrusions 282 are arranged at intervals in the circumferential direction. Each of the protrusions 282 has a through hole 29. Thus, each inner pipe member 22, 24 has a plurality of the through holes 29.

In FIG. 2, three protrusions 282 are arranged at intervals of 120 degrees, but the number of protrusions 282 and the arrangement interval are not limited thereto. Each of the inner pipe members 22 and 24 may include only one protrusion 282, or may include four or more protrusions.

As shown in FIG. 1, one end portion of the first bellows 25 in the axial direction is joined to one end portion (the end portion on a side where the bulging portion 28 is provided) of one inner pipe member 22 of the inner pipe members. The other end portion of the first bellows 25 in the axial direction is joined to one end portion (the end portion on a side where the bulging portion 28 is provided) of the other inner pipe member 24. The first bellows 25 absorbs thermal expansion or thermal contraction of the inner pipe 20 due to the temperature of the fluid flowing inside the inner pipe 20.

The first bellows 25 has a plurality of crest portions 251 forming the outer periphery of the first bellows 25 and a plurality of root portions 252 forming the inner periphery of the first bellows 25. The plurality of crest portions 251 and the plurality of root portions 252 are alternately arranged in the axial direction and connected to each other, so that the first bellows 25 has stretchability in the axial direction. The axial length of the first bellows 25 is longer than the axial length of each of the inner pipe members 22 and 24. The axial length of the first bellows 25 may be equal to or less than the axial length of each of the inner pipe members 22 and 24.

The cross section of the first bellows 25 along the axial direction is a first corrugated cross section having crest portions 251 each curved in a circular arc shape and root portions 252 each curved in a circular arc shape. Therefore, the first corrugated cross section has a shape in which a plurality of S-shapes are connected serially in the axial direction. The crest portion 251 of the first bellows 25 has a C-shaped or U-shaped cross-sectional shape. The root portion 252 of the first bellows 25 has a C-shaped or U-shaped cross-sectional shape. Since the first bellows 25 has the first corrugated cross section as described above, the first bellows 25 has not only stretchability in the axial direction of the inner pipe 20 but also flexibility in a direction perpendicular to the axis Ax of the inner pipe 20. That is, the first bellows 25 can be deformed to bend. Since the first bellows 25 has the above first corrugated cross section, the first bellows 25 has pressure resistance to withstand the pressure applied to the first bellows 25 due to the decompression of the heat insulation chamber 12 and also withstand the pressure of the fluid flowing in the inner pipe 20. In the present embodiment, an interconnection portion 253 connecting the crest portion 251 and the root portion 252 is inclined with respect to a plane perpendicular to the axis Ax of the inner pipe 20. The interconnection portion 253 may be parallel to a plane perpendicular to the axis Ax of the inner pipe 20.

The inner pipe 20 further includes a restriction mechanism 40 coupled to the pair of inner pipe members 22 and 24. The restriction mechanism 40 is coupled to the bulging portion 28 of the one inner pipe member 22 and the bulging portion 28 of the other inner pipe member 24. The restriction mechanism 40 restricts expansion and contraction of the inner pipe 20 in the axial direction to a predetermined range. The restriction mechanism 40 restricts, to a predetermined range, the deformation amount of the inner pipe 20 in the axial direction due to the temperature of the fluid when the fluid flows through the inner pipe 20. The restriction mechanism 40 is slidable with respect to at least one of the pair of bulging portions 28. A plurality of the restriction mechanisms 40 are arranged at intervals in the circumferential direction of the inner pipe 20.

The restriction mechanism 40 includes a connection rod 42 extending along the axial direction of the inner pipe 20. One end of the connection rod 42 is inserted into the through hole 29 of the one inner pipe member 22. The other end of the connection rod 42 is inserted into the through hole 29 of the other inner pipe member 24.

The restriction mechanism 40 further includes a pair of restriction portions 44 (a first restriction portion 44A and a second restriction portion 44B). The pair of restriction portions 44 are fixed to the outer periphery of the connection rod 42 at an interval in the axial direction, and protrude from the outer periphery of the connection rod 42. A portion of the connection rod 42 that is located between the pair of restriction portions 44 is inserted into the through hole 29. The pair of restriction portions 44 are disposed on one end portion of the connection rod 42. In the present embodiment, each of the restriction portions 44 is constituted by two nuts 45 screwed onto the connection rod 42. The two nuts 45 constituting each of the restriction portions 44 are adjacent to each other in the axial direction and are in contact with each other. The configuration of each of the restriction portions 44 is not limited to the nut 45, and may be, for example, a convex portion integrally formed on the outer periphery of the connection rod 42.

The distance between the pair of restriction portions 44 is larger than the axial thickness of the bulging portion 28 (the protrusion 282). Therefore, the one end portion of the connection rod 42 is inserted into the through hole 29 of the one inner pipe member 22 so as to be slidable relative to the through hole 29 in the axial direction. The upper limit of the amount of axial deformation of the inner pipe 20 at the time of thermal expansion and thermal contraction is defined by the distance between the pair of restriction portions 44. In detail, when the first bellows 25 is subjected to force in a direction in which the first bellows 25 is extended in the axial direction, the bulging portion 28 of the one inner pipe member 22 abuts against the first restriction portion 44A in accordance with the extension of the first bellows 25, to thereby prevent the first bellows 25 from being extended any further. When the first bellows 25 is subjected to force in a direction in which the first bellows 25 is contracted in the axial direction, the bulging portion 28 of the one inner pipe member 22 abuts against the second restriction portion 44B in accordance with the contraction of the first bellows 25, to thereby prevent the first bellows 25 from being contracted any further.

The restriction mechanism 40 further includes a fixing member 46 that fixes the other end portion of the connection rod 42 to the bulging portion 28 (specifically, the protrusion 282) of the other inner pipe member 24. The fixing member 46 includes a first fixing nut 461 that abuts on one end surface of the protrusion 282 and a second fixing nut 462 that abuts on the other end surface of the protrusion 282. The first fixing nut 461 and the second fixing nut 462 are screwed onto the connection rod 42. The fixing member 46 prevents the other end portion of the connection rod 42 and the bulging portion 28 of the other inner pipe member 24 from moving relative to each other in the axial direction. Therefore, the other end portion of the connection rod 42 is inserted into the through hole 29 of the other inner pipe member 24 so as not to be slidable. The fixing means for fixing the other end portion of the connection rod 42 to the bulging portion 28 (the protrusion 282) of the other inner pipe member 24 is not limited to the above-described configuration, and may be welding, for example. Note that, similarly to the one end portion of the connection rod 42, the other end portion of the connection rod 42 may also be slidably inserted into the through hole 29 of the other inner pipe member 24.

The outer pipe 30 is disposed coaxially with the inner pipe 20. The inner pipe 20 and the outer pipe 30 jointly form a double pipe structure. The outer pipe 30 includes a pair of outer pipe members 32 and 33, and a second cylindrical portion 38 disposed between the pair of outer pipe members 32 and 33. The pair of outer pipe members 32 and 33 are joined to the pair of inner pipe members 22 and 24, respectively. Each of the pair of outer pipe members 32 and 33 has a second bellows 34 which is expandable and contractible along the axial direction of the inner pipe 20. Each of the outer pipe members 32 and 33 further includes a large-diameter ring member 36 joined to one end of the second bellows 34, and a small-diameter ring member 37 joined to the other end of the second bellows 34.

The second bellows 34 has a plurality of crest portions 341 forming the outer periphery of the second bellows 34 and a plurality of root portions 342 forming the inner periphery of the second bellows 34. The plurality of crest portions 341 and the plurality of root portions 342 are alternately arranged in the axial direction and connected to each other, so that the second bellows 34 has stretchability in the axial direction. The inner diameter of the second bellows 34 is larger than the outer diameter of the first cylindrical portion 26 of each of the inner pipe members 22 and 24.

The corrugated shape of the second bellows 34 is different from the wave shape of the first bellows 25. The cross section of the second bellows 34 along the axial direction is a second corrugated cross section having crest portions 341 each bent in a V-shape and root portions 342 each bent in a V-shape. Therefore, the second corrugated cross section has a shape in which a plurality of V shapes upside down to each other are connected serially in the axial direction. The outer diameter of the second bellows 34 is equal to or smaller than the outer diameter of the second cylindrical portion 38. The second bellows 34 is configured by a plurality of circular annular dish-shaped plate members 340 being connected in series. Specifically, the outer circumferences of the plate members 340 adjacent to each other are connected to each other, and the inner circumferences of the plate members 340 adjacent to each other are connected to each other. The spring constant of the second bellows 34 is smaller than the spring constant of the first bellows 25.

The large-diameter ring member 36 of one outer pipe member 32 of the outer pipe members is joined to one end of the second cylindrical portion 38. The large-diameter ring member 36 of the other outer pipe member 33 is joined to the other end portion of the second cylindrical portion 38. The outer diameter of each large-diameter ring member 36 is substantially the same as the outer diameter of the second cylindrical portion 38. The large-diameter ring member 36 includes a circular annular first outer peripheral wall 361 joined to the second cylindrical portion 38, and a circular annular first side wall 362 projecting radially inward from an end portion of the first outer peripheral wall 361 that is on the other side opposite to the side connected to the second cylindrical portion 38. The inner circumference of the first side wall 362 is joined to one end of the second bellows 34.

In each of the outer pipe members 32 and 33, a small-diameter ring member 37 is joined to the other end of the second bellows 34. The outer diameter of the small-diameter ring member 37 is smaller than the outer diameter of the second cylindrical portion 38 and the outer diameter of the second bellows 34. The small-diameter ring member 37 includes a circular annular second outer peripheral wall 371 joined to the other end of the second bellows 34, and a circular annular second side wall 372 projecting radially inward from an end portion of the second outer peripheral wall 371 that is on the other side opposite to the side connected to the second bellows 34. The inner circumference of the second side wall 372 is joined to the outer periphery of the inner pipe member 22, 24 at an end portion of the inner pipe member 22, 24 that is on the other side opposite to the side connected to the first bellows 25. The first cylindrical portion 26 of the inner pipe member 22, 24 protrudes in the axial direction from the outer pipe member 32, 33 (specifically, from the second side wall 372 of the small-diameter ring member 37).

The second cylindrical portion 38 houses the first bellows 25 and the restriction mechanism 40. The second cylindrical portion 38 is a straight pipe having an inner diameter and an outer diameter that are substantially constant in the axial direction. The inner diameter of the second cylindrical portion 38 is set to a size such that the inner circumferential surface of the second cylindrical portion 38 is not in contact with the bulging portions 28 (the protrusions 282) of the inner pipe members 22 and 24 and the restriction mechanism 40. That is, the distance from the axis Ax of the inner pipe 20 to the inner circumferential surface of the second cylindrical portion 38 (i.e., the radius of the inner diameter of the second cylindrical portion 38) is larger than the distance between the axis Ax of the inner pipe 20 and the tips of the protrusions 282 of the inner pipe members 22, 24 and the distance between the axis Ax of the inner pipe 20 and a portion of the restriction mechanism 40 that is farthest from the axis Ax. The axial length of the second cylindrical portion 38 is longer than the axial length of the outer pipe members 32 and 33.

Figure 3:
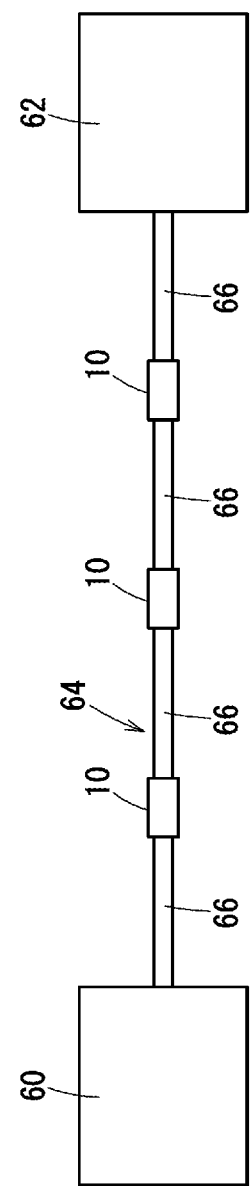
FIG. 3 is a schematic view showing an example of application of the heat insulation pipe.

One example of application of the heat insulation pipe 10 is shown in FIG. 3. A transfer line 64 is connected to a liquefaction refrigerator 60 and a supply destination device 62. A cryogenic refrigerant is supplied from the liquefaction refrigerator 60 to the supply destination device 62 via the transfer line 64. In order to absorb thermal contraction of the transfer line 64 through which the cryogenic refrigerant flows, the transfer line 64 is equipped with a thermal contraction structure. To be specific, the transfer line 64 includes a plurality of piping members 66 (piping main bodies) and a plurality of heat insulation pipes 10 arranged as joint devices between the plurality of piping members 66. As shown in FIG. 1, the heat insulation pipe 10 is provided with the restriction mechanism 40 that restricts the amount of deformation of the heat insulation pipe 10 caused by thermal expansion or thermal contraction of the first bellows 25 to a predetermined range. Thus, in the plurality of heat insulation pipes 10, it is possible to prevent the amounts of expansion/contraction of the plurality of first bellows 25 from becoming uneven.

The heat insulation pipe 10 may be applied as a joint device of an exhaust pipe of an automobile or the like. The heat insulation pipe 10 is not limited to being applied as a joint device. A plurality of the heat insulation pipes 10 may be connected to each other to form a long pipe.

The present embodiment has the following advantageous effects.

As shown in FIG. 1, the restriction mechanism 40 for restricting, to a predetermined range, the amount of deformation of the inner pipe 20 (first bellows 25) caused by thermal expansion or thermal contraction of the pipe to which the heat insulation pipe 10 is applied is disposed in the inside of the outer pipe 30 (i.e., a space formed between the outer pipe 30 and the inner pipe 20). Thus, it is possible to prevent the increase in the outside diameter of the heat insulation pipe 10 due to the installation of the restriction mechanism. Since the restriction mechanism 40 restricts the deformation amount (expansion/contraction amount) of the first bellows 25 to a predetermined range, the restriction mechanism 40 can exhibit a deformation amount restriction function for both thermal expansion and thermal contraction. Since the inner pipe 20 and the restriction mechanism 40 are integrated together, when the heat insulation pipe 10 is assembled, the inner pipe 20 integrated with the restriction mechanism 40 can be disposed in the outer pipe 30, and the inner pipe members 22 and 24 of the inner pipe 20 can be positioned at the openings of the outer pipe members 32 and 33 of the outer pipe 30. Therefore, the heat insulation pipe 10 can be easily assembled.

The restriction mechanism 40 includes the connection rod 42 extending along the axial direction of the inner pipe 20. The bulging portion 28 has the through hole 29 that penetrates in the axial direction. A portion of the connection rod 42 is slidably inserted into the through hole 29. With this configuration, the connection rod 42 is guided in the axial direction by the through hole 29, and thus it is possible to suitably exhibit the deformation amount restriction function at the time of thermal expansion and thermal contraction of the pipe.

The restriction mechanism 40 has a pair of restriction portions 44 fixed to the outer periphery of the connection rod 42 at an interval in the axial direction and projecting from the outer periphery. A portion of the connection rod 42 that is located between the pair of restriction portions 44 is inserted into the through hole 29. With this configuration, the range of movement within which the projection can move with respect to the connection rod 42 is limited to a range between the pair of restriction portions 44. Thus, the expansion and contraction of the inner pipe 20 can be effectively limited to a predetermined range.

A plurality of the restriction mechanisms 40 are arranged at intervals in the circumferential direction of the inner pipe 20. With this configuration, the restriction load on the restriction mechanisms 40 at the time of thermal expansion and contraction of the heat insulation pipe 10 is dispersed in the circumferential direction. Thus, the deformation amount restriction function can be more favorably exhibited.

When the space between the inner pipe 20 and the outer pipe 30 is decompressed to a predetermined pressure, a high heat insulation effect is achieved.

When the space between the inner pipe 20 and the outer pipe 30 is filled with an inert gas, a high heat insulation effect is achieved.

The corrugated shape of the first bellows 25 and the corrugated shape of the second bellows 34 are different in shape from each other. With this configuration, the inner pipe 20 and the outer pipe 30 are formed so as to have optimal bellows shapes, respectively, and thus the heat insulation pipe 10 can more favorably exhibit the function of absorbing thermal expansion and thermal contraction as a whole.

The cross section of the first bellows 25 along the axial direction is the first corrugated cross section having the crest portions 251 each curved in a circular arc shape and the root portions 252 each curved in a circular arc shape. The cross section of the second bellows 34 along the axial direction is the second corrugated cross section having the crest portions 341 each bent in a V-shape and the root portions 342 each bent in a V-shape. The corrugated cross section in which the crest portions 251 and the root portions 252 are curved in circular arc shapes is likely to be deformed so as to bend as a whole rather than to contract when being subjected to external force received from the axial direction. Thus, such a corrugated cross section is suitable as the cross sectional shape of the first bellows 25 of the inner pipe which receives pressure from the fluid flowing thereinside. The corrugated cross section in which the crest portions 341 and the root portions 342 are bent in a V-shape is likely to be deformed so as to contract when being subjected to an external force applied from the axial direction. Thus, such a corrugated cross section is suitable as the cross sectional shape of the second bellows 34 which receives the deformation of the entire heat insulation pipe 10.

As shown in FIG. 1, the cross section of the first bellows 25 of the inner pipe 20 is the first corrugated cross section having the crest portions 251 and the root portions 252 each curved in a C-shape or a U-shape. Thus, the first bellows 25 can effectively absorb the input of the external force by not only expanding/contracting in the axial direction but also deforming so as to bend. On the other hand, the second bellows 34 of the outer pipe 30 has the second corrugated cross section having the crest portions 341 and the root portions 342 which are each bent in a V-shape. Thus, the second bellows is likely to deform so as to contract when receiving the external force from the axial direction. Therefore, the second corrugated cross section is suitable as the cross sectional shape of the second bellows 34 that receives the deformation of the entire heat insulation pipe 10. The second bellows 34 having the second corrugated cross section is easily deformed in the axial direction but is hardly deformed in the bending direction, when being subjected to thermal expansion or thermal contraction in the axial direction and input of external force. Therefore, even when the first bellows 25 of the inner pipe 20 is deformed to bend, the second bellows 34 expands or contracts in the axial direction without bending, and thus its straight piping layout can be maintained.

The spring constant of the second bellows 34 is smaller than the spring constant of the first bellows 25. With this configuration, the second bellows 34 of the outer pipe 30 is easily deformed, and the following capability of the second bellows 34 of the outer pipe 30 with respect to deformation of the inner pipe 20 is improved, so that axial load acting on the second cylindrical portion 38 when the outer pipe 30 is deformed is reduced. This makes it possible to reduce the thickness of the second cylindrical portion 38 of the outer pipe 30.

The restriction mechanism 40 includes the connection rod 42 extending along the axial direction of the inner pipe 20. One end portion of the connection rod 42 is inserted into the through hole 29 formed in the bulging portion 28 of the one inner pipe member 22, and the other end portion of the connection rod 42 is inserted into the through hole 29 formed in the bulging portion 28 of the other inner pipe member 24. The pair of restriction portions 44 are provided on the one end portion of the connection rod 42, and the fixing member 46 is provided on the other end portion of the connection rod 42. With this configuration, the restriction mechanism 40 is integrated with the inner pipe 20, and thus it is possible to improve the easiness of assembling the heat insulation pipe 10. Further, since one end portion of the connection rod 42 is connected to the one inner pipe member 22 and the other end portion of the connection rod 42 is connected to the other inner pipe member 24, the heat insulation pipe 10 can be maintained in a state of extending straight as a whole.

In relation to the above-described disclosure, the following Supplementary Notes are further disclosed.

Supplementary Note 1

The heat insulation pipe (10) includes the inner pipe (20) and the outer pipe (30) containing thereinside the inner pipe, wherein both ends of the outer pipe are joined to the inner pipe to thereby seal the inside of the outer pipe. The inner pipe includes: the pair of inner pipe members (22, 24) each including the first cylindrical portion (26) and the bulging portion (28) that protrudes radially outward from the outer circumferential surface of the first cylindrical portion, the pair of inner pipe members being spaced apart from each other in the axial direction of the inner pipe; the first bellows (25) disposed between the pair of inner pipe members and configured to absorb thermal expansion or thermal contraction of a pipe caused by the temperature of a fluid flowing through the inside of the pipe; and the restriction mechanism (40) that is coupled to the bulging portion of one of the pair of inner pipe members and to the bulging portion of another of the pair of inner pipe members, and configured to restrict expansion and contraction of the inner pipe in the axial direction to a predetermined range, the restriction mechanism is slidable with respect to at least one of the pair of the bulging portions, and the outer pipe includes: the pair of outer pipe members (32, 33) each including the second bellows (34) expandable and contractible along the axial direction of the inner pipe, the pair of outer pipe members being joined respectively to the pair of inner pipe members; and the second cylindrical portion (38) disposed between the pair of outer pipe members and configured to accommodate the first bellows and the restriction mechanism. With this configuration, the restriction mechanism for restricting, to a predetermined range, the amount of deformation of the first bellows caused by thermal expansion or thermal contraction of the pipe to which the heat insulation pipe is applied is disposed in the inside of the outer pipe (i.e., a space formed between the outer pipe and the inner pipe). Thus, it is possible to prevent the increase in the outer diameter of the heat insulation pipe due to the installation of the restriction mechanism. Since the restriction mechanism restricts the deformation amount (expansion/contraction amount) of the first bellows to a predetermined range, the restriction mechanism can exhibit a deformation amount restriction function for both thermal expansion and thermal contraction. The inner pipe and the restriction mechanism are integrated together. Thus, when the heat insulation pipe is assembled, the inner pipe integrated with the restriction mechanism can be disposed in the outer pipe, and the inner pipe members of the inner pipe can be positioned at the openings of the outer pipe members of the outer pipe. Therefore, the heat insulation pipe can be easily assembled.

Supplementary Note 2

In the heat insulation pipe according to Supplementary Note 1, the restriction mechanism may include the connection rod (42) extending along the axial direction of the inner pipe, the bulging portion may include the through hole (29) penetrating in the axial direction, and the portion of the connection rod may be slidably inserted into the through hole. With this configuration, the connection rod is guided in the axial direction by the through hole, and thus it is possible to suitably exhibit the deformation amount restriction function at the time of thermal expansion and thermal contraction of the pipe. Further, even when a load in the axial direction is input to the pipe, the first bellows can be prevented from buckling because the connection rod is provided. For example, when the piping layout as shown in FIG. 3 is adopted, a load generated by difference in the expansion amount or the contraction amount of each member constituting the pipe can be a load applied to the pipe in the axial direction.

Supplementary Note 3

In the heat insulation pipe of Supplementary Note 2, the restriction mechanism may include the pair of restriction portions (44) that are spaced apart from each other in the axial direction and fixed to the outer periphery of the connection rod, the pair of restriction portions protruding from the outer periphery, and the portion of the connection rod that lies between the pair of restriction portions may be inserted into the through hole. With this configuration, the range of movement within which the projection can move with respect to the connection rod is limited to a range between the pair of restriction portions. Thus, the expansion and contraction of the inner pipe can be effectively limited to a predetermined range.

Supplementary Note 4

In the heat insulation pipe according to any one of Supplementary Notes 1 to 3, the plurality of the restriction mechanisms may be disposed at intervals in the circumferential direction of the inner pipe. With this configuration, the restriction load on the restriction mechanisms at the time of thermal expansion and contraction of the heat insulation pipe is dispersed in the circumferential direction. Thus, the deformation amount restriction function can be more favorably exhibited.

Supplementary Note 5

In the heat insulation pipe according to any one of Supplementary Notes 1 to 4, a space between the inner pipe and the outer pipe may be decompressed to a predetermined pressure. This configuration provides a high heat insulation effect.

Supplementary Note 6

In the heat insulation pipe according to any one of Supplementary Notes 1 to 4, a space between the inner pipe and the outer pipe may be filled with an inert gas. This configuration provides a high heat insulation effect.

Supplementary Note 7

In the heat insulation pipe according to any one of Supplementary Notes 1 to 6, the corrugated shape of the first bellows and the corrugated shape of the second bellows may be different from each other. With this configuration, the inner pipe and the outer pipe are formed so as to have optimal bellows shapes, respectively, and thus the heat insulation pipe can more favorably exhibit the function of absorbing thermal expansion and thermal contraction as a whole.

Supplementary Note 8

In the heat insulation pipe according to Supplementary Note 7, the cross section of the first bellows along the axial direction of the first bellows may be the first corrugated cross section having the crest portions (251) each curved in a C-shape or a U-shape and the root portions (252) each curved in a C-shape or a U-shape, and the cross section of the second bellows along the axial direction of the second bellows may be the second corrugated cross section having the crest portions (341) each bent in a V-shape and the root portions (342) each bent in a V-shape. The corrugated cross section in which the crest portions and the root portions are curved in circular arc shapes is likely to be deformed so as to bend as a whole rather than to contract, when being subjected to external force received from the axial direction. Thus, such a corrugated cross section is suitable as the cross sectional shape of the first bellows of the inner pipe which receives pressure from the fluid flowing thereinside. The corrugated cross section in which the crest portions and the root portions are bent in V-shapes is likely to be deformed so as to contract, when being subjected to an external force applied from the axial direction. Thus, such a corrugated cross section is suitable as the cross sectional shape of the second bellows which receives the deformation of the entire heat insulation pipe.

Supplementary Note 9

In the heat insulation pipe according to Supplementary Note 8, the second bellows may be configured by the plurality of circular annular dish-shaped plate members (340) being connected in series, outer circumferences of the plate members adjacent to each other may be connected to each other, and inner circumferences of the plate members adjacent to each other may be connected to each other.

Supplementary Note 10

The heat insulation pipe (10) includes the inner pipe (20) and the outer pipe (30) containing thereinside the inner pipe, wherein both ends of the outer pipe are joined to the inner pipe to thereby seal the inside of the outer pipe, and a space between the inner pipe and the outer pipe is depressurized to a predetermined pressure. The inner pipe includes: the pair of inner pipe members (22, 24) spaced apart from each other in the axial direction of the inner pipe; the first bellows (25) disposed between the pair of inner pipe members and configured to absorb thermal expansion or thermal contraction of the pipe caused by the temperature of a fluid flowing through an inside of the pipe; and the restriction mechanism (40) configured to restrict, to a predetermined range, the amount of deformation of the inner pipe in the axial direction caused by the temperature of the fluid when the fluid flows through the inner pipe, the outer pipe includes: the pair of outer pipe members (32, 33) each including the second bellows (34) expandable and contractible along the axial direction of the inner pipe, the pair of outer pipe members being joined respectively to the pair of inner pipe members; and the second cylindrical portion (38) disposed between the pair of outer pipe members and configured to accommodate the first bellows and the restriction mechanism, the cross section of the first bellows along the axial direction of the first bellows is the first corrugated cross section having the crest portions (251) each curved in a C-shape or a U-shape and the root portions (252) each curved in a C-shape or a U-shape, and the cross section of the second bellows along the axial direction of the second bellows is the second corrugated cross section having the crest portions (341) each bent in a V-shape and the root portions (342) each bent in a V-shape. The cross section of the first bellows of the inner pipe is the first corrugated cross section having the crest portions and the root portions each curved in a C-shape or a U-shape. Thus, the first bellows can absorb the input of the external force by not only expanding/contracting in the axial direction but also deforming so as to bend. On the other hand, the second bellows of the outer pipe has the second corrugated cross section having the crest portions and the root portions each bent in a V-shape. Thus, the second bellows is easily deformed in the axial direction but is hardly deformed in the bending direction, when being subjected to thermal expansion or thermal contraction in the axial direction and input of external force. Therefore, even when the first bellows of the inner pipe is deformed to bend, the second bellows expands or contracts in the axial direction without bending, and thus its straight piping layout can be maintained.

Supplementary Note 11

In the heat insulation pipe according to Supplementary Note 10, the spring constant of the second bellows may be smaller than the spring constant of the first bellows. With this configuration, the second bellows of the outer pipe is easily deformed, and the following capability of the second bellows of the outer pipe with respect to deformation of the inner pipe is improved, so that axial load acting on the second cylindrical portion when the outer pipe is deformed is reduced. This makes it possible to reduce the thickness of the second cylindrical portion of the outer pipe.

Supplementary Note 12

In the heat insulation pipe according to Supplementary Note 10 or 11, each of the pair of inner pipe members may include the cylindrical portion (26) and the bulging portion (28) that protrudes radially outward from the outer circumferential surface of the cylindrical portion, the bulging portion may include the through hole (29) penetrating in the axial direction, and the restriction mechanism may include: the connection rod (42) extending along the axial direction of the inner pipe, the connection rod including one end portion that is inserted into the through hole formed in the bulging portion of one of the pair of inner pipe members, and another end portion that is inserted into the through hole formed in the bulging portion of another of the pair of inner pipe members; the pair of restriction portions (44) that are spaced apart from each other in the axial direction at the one end portion of the connection rod and fixed to the outer periphery of the connection rod, the pair of restriction portions protruding from the outer periphery; and the fixing member (46) configured to fix the other end portion of the connection rod to the bulging portion of the other inner pipe member. With this configuration, the restriction mechanism is integrated with the inner pipe, and thus it is possible to improve the easiness of assembling the heat insulation pipe. Further, since one end portion of the connection rod is connected to one inner pipe member and the other end portion of the connection rod is connected to the other inner pipe member, the heat insulation pipe can be maintained in a state of extending straight as a whole. Even when a load in the axial direction is input to the pipe, the first bellows can be prevented from buckling because the connection rod is provided. For example, when the piping layout as shown in FIG. 3 is adopted, a load generated by difference in the expansion amount or the contraction amount of each member constituting the pipe can be a load applied to the pipe in the axial direction.

Supplementary Note 13

In the heat insulation pipe according to any one of Supplementary Notes 10 to 12, the second bellows may be configured by the plurality of circular annular dish-shaped plate members being connected in series, the outer circumferences of the plate members adjacent to each other may be connected to each other, and the inner circumferences of the plate members adjacent to each other may be connected to each other.

Moreover, it should be noted that the present invention is not limited to the disclosure described above, but various configurations may be adopted therein without departing from the essence and gist of the present invention.

The invention claimed is:

1. A heat insulation pipe comprising an inner pipe and an outer pipe containing thereinside the inner pipe, wherein both ends of the outer pipe are joined to the inner pipe to thereby seal an inside of the outer pipe, wherein the inner pipe includes:
a pair of inner pipe members each including a first cylindrical portion and a bulging portion that protrudes radially outward from an outer circumferential surface of the first cylindrical portion, the pair of inner pipe members being spaced apart from each other in an axial direction of the inner pipe;
a first bellows disposed between the pair of inner pipe members and configured to absorb thermal expansion or thermal contraction of a pipe caused by a temperature of a fluid flowing through an inside of the pipe; and
a restriction mechanism that is coupled to the bulging portion of one of the pair of inner pipe members and to the bulging portion of another of the pair of inner pipe members, and configured to restrict expansion and contraction of the inner pipe in the axial direction to a predetermined range, the restriction mechanism is slidable with respect to at least one of a pair of the bulging portions, and the outer pipe includes:

a pair of outer pipe members each including a second bellows expandable and contractible along the axial direction of the inner pipe, the pair of outer pipe members being joined respectively to the pair of inner pipe members; and a second cylindrical portion disposed between the pair of outer pipe members and configured to accommodate the first bellows and the restriction mechanism.

2. The heat insulation pipe according to claim 1, wherein the restriction mechanism includes a connection rod extending along the axial direction of the inner pipe, the bulging portion includes a through hole penetrating in the axial direction, and a portion of the connection rod is slidably inserted into the through hole.

3. The heat insulation pipe according to claim 2, wherein the restriction mechanism includes a pair of restriction portions that are spaced apart from each other in the axial direction and fixed to an outer periphery of the connection rod, the pair of restriction portions protruding from the outer periphery, and a portion of the connection rod that lies between the pair of restriction portions is inserted into the through hole.

4. The heat insulation pipe according to claim 1, wherein a plurality of the restriction mechanisms are disposed at intervals in a circumferential direction of the inner pipe.

5. The heat insulation pipe according to claim 1, wherein a space between the inner pipe and the outer pipe is depressurized to a predetermined pressure.

6. The heat insulation pipe according to claim 1, wherein a space between the inner pipe and the outer pipe is filled with an inert gas.

7. The heat insulation pipe according to claim 1, wherein a corrugated shape of the first bellows and a corrugated shape of the second bellows are different from each other.

8. The heat insulation pipe according to claim 7, wherein a cross section of the first bellows along an axial direction of the first bellows is a first corrugated cross section having crest portions each curved in a C-shape or a U-shape and root portions each curved in a C-shape or a U-shape, and a cross section of the second bellows along an axial direction of the second bellows is a second corrugated cross section having crest portions each bent in a V-shape and root portions each bent in a V-shape.

9. The heat insulation pipe according to claim 8, wherein the second bellows is configured by a plurality of circular annular dish-shaped plate members being connected in series, outer circumferences of the plate members adjacent to each other are connected to each other, and inner circumferences of the plate members adjacent to each other are connected to each other.

10. The heat insulation pipe according to claim 8, wherein a spring constant of the second bellows is smaller than a spring constant of the first bellows.

11. A heat insulation pipe comprising an inner pipe and an outer pipe containing thereinside the inner pipe, wherein both ends of the outer pipe are joined to the inner pipe to thereby seal an inside of the outer pipe, and a space between the inner pipe and the outer pipe is depressurized to a predetermined pressure, wherein the inner pipe includes:

a pair of inner pipe members spaced apart from each other in an axial direction of the inner pipe;

a first bellows disposed between the pair of inner pipe members and configured to absorb thermal expansion or thermal contraction of a pipe caused by a temperature of a fluid flowing through an inside of the pipe; and a restriction mechanism configured to restrict, to a predetermined range, an amount of deformation of the inner pipe in the axial direction caused by the temperature of the fluid when the fluid flows through the inner pipe, the outer pipe includes:

a pair of outer pipe members each including a second bellows expandable and contractible along the axial direction of the inner pipe, the pair of outer pipe members being joined respectively to the pair of inner pipe members; and a second cylindrical portion disposed between the pair of outer pipe members and configured to accommodate the first bellows and the restriction mechanism, a cross section of the first bellows along an axial direction of the first bellows is a first corrugated cross section having crest portions each curved in a C-shape or a U-shape and root portions each curved in a C-shape or a U-shape, and a cross section of the second bellows along an axial direction of the second bellows is a second corrugated cross section having crest portions each bent in a V-shape and root portions each bent in a V-shape, the restriction mechanism includes a connection rod extending along the axial direction of the inner pipe, and the connection rod is placed across the pair of inner pipe members.

12. A heat insulation pipe comprising an inner pipe and an outer pipe containing thereinside the inner pipe, wherein both ends of the outer pipe are joined to the inner pipe to thereby seal an inside of the outer pipe, and a space between the inner pipe and the outer pipe is depressurized to a predetermined pressure, wherein the inner pipe includes:

a pair of inner pipe members spaced apart from each other in an axial direction of the inner pipe;

a first bellows disposed between the pair of inner pipe members and configured to absorb thermal expansion or thermal contraction of a pipe caused by a temperature of a fluid flowing through an inside of the pipe; and a restriction mechanism configured to restrict, to a predetermined range, an amount of deformation of the inner pipe in the axial direction caused by the temperature of the fluid when the fluid flows through the inner pipe, the outer pipe includes:

a pair of outer pipe members each including a second bellows expandable and contractible along the axial direction of the inner pipe, the pair of outer pipe members being joined respectively to the pair of inner pipe members; and a second cylindrical portion disposed between the pair of outer pipe members in the axial direction of the inner pipe at a position where the second cylindrical portion does not accommodate the second bellows, and configured to accommodate the first bellows and the restriction mechanism, a cross section of the first bellows along an axial direction of the first bellows is a first corrugated cross section having crest portions each curved in a C-shape or a U-shape and root portions each curved in a C-shape or a U-shape, and a cross section of the second bellows along an axial direction of the second bellows is a second corrugated cross section having crest portions each bent in a V-shape and root portions each bent in a V-shape.

13. The heat insulation pipe according to claim 12, wherein each of the pair of outer pipe members includes a first ring member joined to one end of the second bellows in the axial direction of the inner pipe, and a second ring member joined to another end of the second bellows in the axial direction of the inner pipe, the first ring member is joined to the second cylindrical portion, the second ring member is joined to each of the pair of inner pipe members, and the first ring member and the second bellows are disposed between the second cylindrical portion and the second ring member in the axial direction of the inner pipe.

\* \* \* \* \*